May 10, 1932. J. F. HODGSON 1,858,015
POWER SAW
Filed Oct. 8, 1931 2 Sheets-Sheet 1
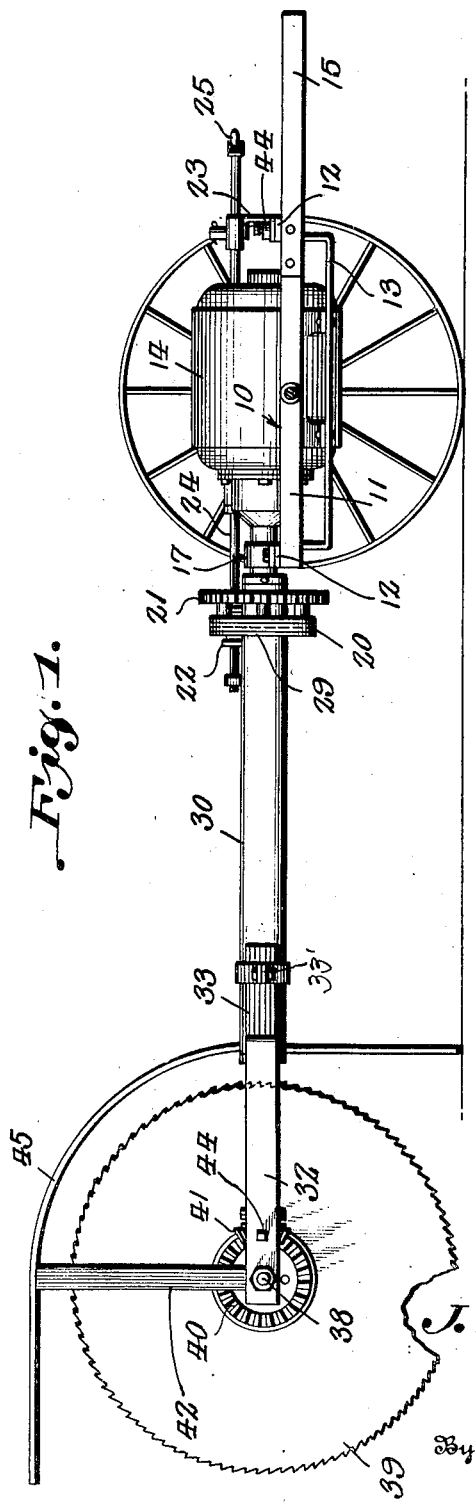
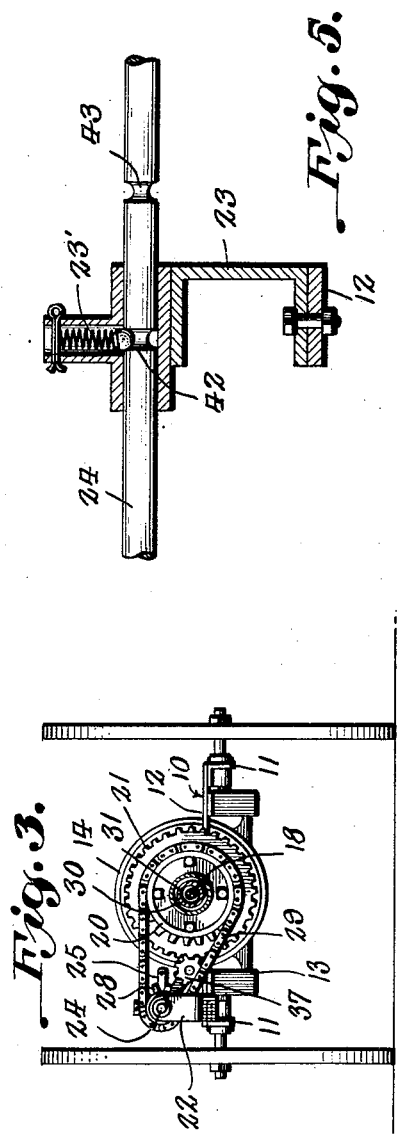
J. F. Hodgson, Inventor

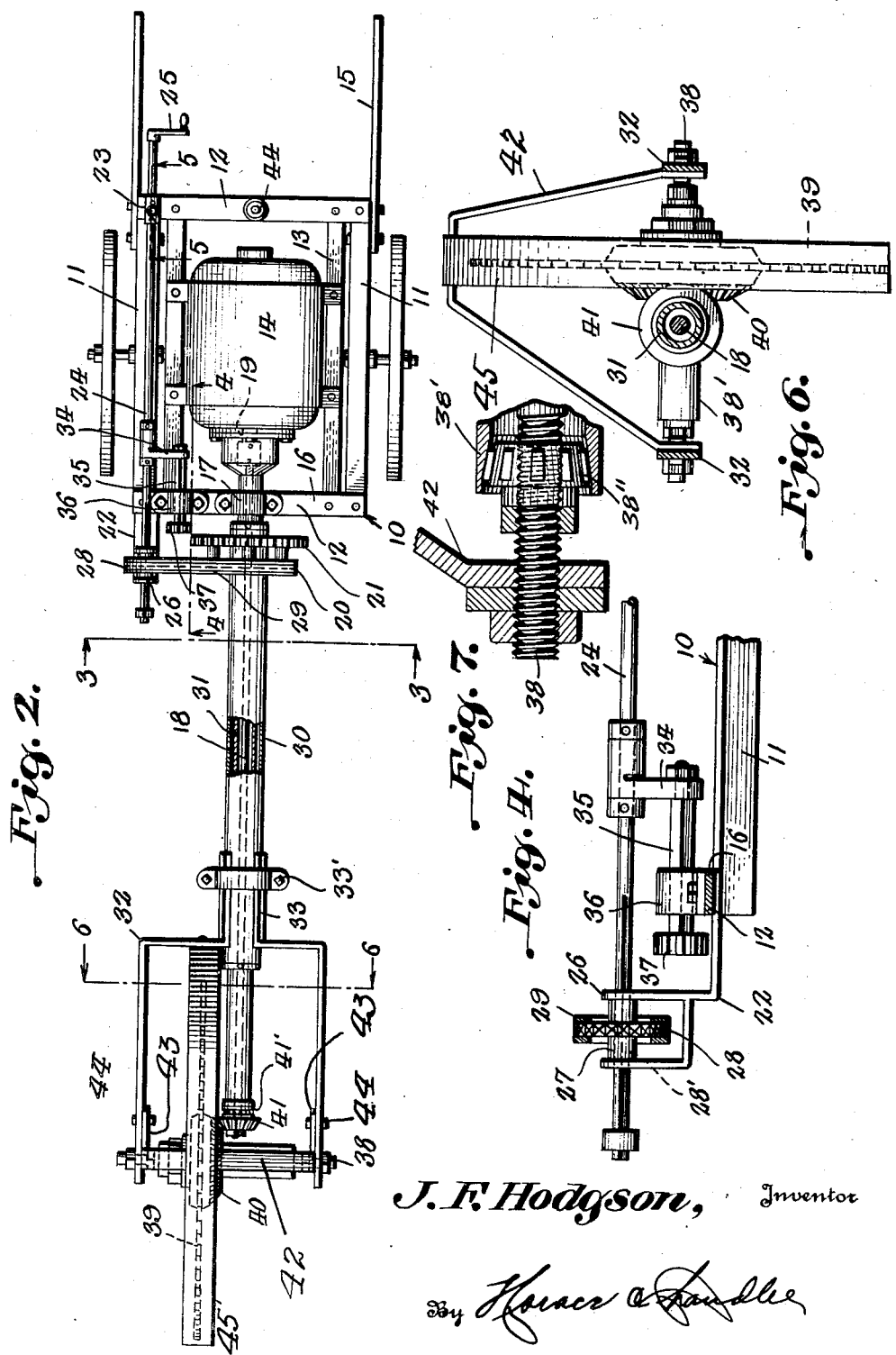

Patented May 10, 1932

1,858,015

UNITED STATES PATENT OFFICE

JAMES F. HODGSON, OF MINERSVILLE, PENNSYLVANIA

POWER SAW

Application filed October 8, 1931. Serial No. 567,731.

This invention relates to new and useful improvements in sawing machines, and particularly to portable sawing machines.

One object of the invention is to provide a device of this character which is simple in construction, and which can be easily engaged or disengaged with respect to the work to be cut.

Another object is to provide a device of this character which includes novel means for manipulating the saw into various angles, with respect to the work, and for starting and stopping the saw, from the operator's position where he moves the device from one site to another.

Other objects and advantages will be apparent from the following description when taken in connection with the accompanying drawings.

In the drawings:

Figure 1 is a side elevation of the invention, one of the wheels being removed.

Figure 2 is a top plan view of the device.

Figure 3 is an enlarged vertical transverse sectional view on the line 3—3 of Figure 2.

Figure 4 is an enlarged vertical detail sectional view on the line 4—4 of Figure 2, longitudinally thereof.

Figure 5 is a vertical longitudinal sectional view, enlarged, on the line 5—5 of Figure 2.

Figure 6 is a vertical transverse sectional view on the line 6—6 of Figure 2.

Figure 7 is a detail sectional view of one end of the saw shaft and bearings.

Referring particularly to the accompanying drawings, there is shown a frame, represented as a whole, by the number 10, and including the side bars 11, the transverse bars 12, and the suspended platform 13, on which is mounted the motor 14. It will be particularly noted that the side bars 11 extend beyond the wheels, at one end, to provide handles 15, by means of which the device may be manipulated and moved around, from place to place. On the front cross member 16, of the frame 10 is a bearing 17, in which is supported the inner end of the forwardly extending shaft 18, the rear end of which is connected with the forward end of the motor shaft 19.

Surrounding the shaft 18, immediately forward of the front cross member of the frame 10, is a unitary structure, including the sprocket wheel 20, and the gear wheel 21, operating as a unit with the said shaft. Mounted on the said front cross member, adjacent one side of the frame 10, is a vertical bracket 22, while mounted at a corresponding point, on the rear of the frame, is a vertical bracket 23. Extending longitudinally of the frame 10, and having its ends rotatably supported in said brackets, is a shaft 24, the rear end of which is provided with a crank handle 25, for rotating the shaft.

The forward end of the forward bracket 22 is provided with a vertical forked portion 26, through the outer ends of which extends the said forward end of the shaft 24. Rotatably supported in the apertured ends of the furcations of the bracket 22 is the hub portion 27 of the sprocket wheel 28, said hub having a bore 28', of square cross section, which is adapted to slidably receive the correspondingly enlarged end portion of the shaft 24, so that rotation of the said shaft will rotate the sprocket wheel 28, which in turn, will drive the structure 20—21, through the medium of the drive chain 29. Surrounding the shaft 18 is a tubular member 30, within which is disposed, and to which is secured, the before-mentioned sprocket and gear device 20—21. Within the tubular member 30, and immediately surrounding the shaft 18, is a second tubular member 31, one end of which is connected to the motor casing 14, and held to the frame 10 by the clamp 17.

A bifurcated frame 32 has a split tubular portion 33 on its bight, extending rearwardly therefrom, and received in said portion 33 is the outer end of the tubular member 30, said end being held in said portion by the clamp 33', so that, upon rotation of the tubular member 30, the frame 32 will also be rotated. Adjustably mounted on the shaft 24 is a laterally extending arm 34, and secured in the outer end of said arm is a shaft 35, which extends in parallel relation with the shaft 24, and is slidably disposed through an opening in a bracket 36, in the front cross member 16, said shaft 35 being angular in cross section, and the opening in the bracket being correspondingly shaped, so as to prevent rotatable movement of the shaft 35 in said bracket.

Disposed transversely in the outer end of the frame 32, with its ends threaded thereinto, is a shaft 38, and mounted on the shaft, by means of the sleeve 38', is a circular saw blade 39, said sleeve carrying a gear 40, meshing with the gear 41, on the forward end of the shaft 18, whereby the saw is driven. Threaded on the ends of the shaft and engaged in the ends of the sleeve are the tapered roller bearing members 38''.

The other end of the tubular member 31 is disposed adjacent the gear 41, and bearings 41' are arranged between said tube end and said gear.

The rear bracket 23 is provided with a spring pressed ball ratchet means 23', adapted for engagement in the peripheral grooves 42 and 43, formed in the rear end of the shaft 24, by means of which said shaft may be moved longitudinally through the brackets 22 and 23, whereby to engage the gear 37 with, and to disengage the same from, the gear wheel 21, after the said shaft 24 has been rotated to dispose the saw at the proper angle for operation, and at the same time hold the tubular member 30, and the shaft 24, from rotation during such operation of the device.

On the rear part of the frame 10 is a switch 44, by means of which the electric motor is controlled, by the operator, from his station between the handles of the said frame.

It will be understood that the operator grasps the handles 15 and manipulates the device so as to dispose the saw blades in the proper position with respect to the work to be acted upon, by lowering the saw upon the work, raising the saw upwardly beneath the work, or pushing the saw against the work. Upon so disposing the device, the operator grasps the crank handle 25, of the shaft 24, and draws the shaft rearwardly, whereby to withdraw the shaft 35 rearwardly, and thereby disengage the gear 37 from the gear 21. The operator then rotates the shaft 24, with the crank handle 25, to drive the tubular member 30, through the medium of the chain 29, as will be clear from the drawings.

An inverted angular U-shaped frame 42 has the ends of its arms perforated and receiving the ends of the saw shaft 38 therethrough, said arm ends having angularly extending portions 43, which are bolted to the arms of the frame 32, as shown at 44. Secured to the frame 42, and extending circumferentially about, and spaced from the toothed periphery of the saw blade, is a guard 45, the opposite ends of which are adapted to be grasped by the operator so that he may hold and guide the saw in relation to the work.

While I have herein shown and described one particular embodiment of my invention, I wish it to be understood that I do not confine myself to all of the precise details of constructions herein set forth by way of illustration, as modifications and variations may be made without departing from the spirit of the invention or exceeding the scope of the appended claims.

What is claimed is:

1. A portable sawing machine comprising a portable frame, a rotatable support carried by and extending from said frame, a saw frame mounted on the support for rotation therewith, a saw mounted in said saw frame, means for driving said saw, means for rotating said support to change the angular position of said saw and saw frame, and means operable by the power initiating element of the last-named means for locking said support in its different rotative positions.

2. A portable sawing machine comprising a portable frame, a rotatable support carried by and extending from said frame, a saw frame on the outer end of said support for rotation therewith, a saw mounted in said frame, means for driving the saw, and means for rotating said support for changing the angular positions of said saw, said means including a shaft on the portable frame, driving connections between the shaft and support, said shaft being slidable with relation to said driving connections, and a locking means operable by said shaft into and out of engagement with said rotatable support.

3. A portable sawing machine including a portable frame, a rotatable saw support carried by and extending from said frame, a toothed ring on said support, a shaft mounted on the frame and having driving connections with said support, said shaft being slidable with respect to said connections, an arm on said shaft, a short shaft slidably keyed on the frame, a toothed member on the short shaft for movement into and out of meshing engagement with the toothed ring for holding the support in different rotative positions, and means for rotating and sliding said shaft.

In testimony whereof, I affix my signature.
JAMES F. HODGSON.